(12) United States Patent
Bennett

(10) Patent No.: US 7,751,397 B2
(45) Date of Patent: Jul. 6, 2010

(54) SWITCHING NETWORK EMPLOYING A USER CHALLENGE MECHANISM TO COUNTER DENIAL OF SERVICE ATTACKS

(75) Inventor: James D. Bennett, San Clemente, CA (US)

(73) Assignee: Broadcom Corporation, Irvine, CA (US)

(*) Notice: Subject to any disclaimer, the term of this patent is extended or adjusted under 35 U.S.C. 154(b) by 565 days.

(21) Appl. No.: 11/527,137

(22) Filed: Sep. 26, 2006

(65) Prior Publication Data

US 2007/0258438 A1 Nov. 8, 2007

Related U.S. Application Data

(63) Continuation-in-part of application No. 11/429,477, filed on May 5, 2006, and a continuation-in-part of application No. 11/429,478, filed on May 5, 2006, now Pat. No. 7,596,137, and a continuation-in-part of application No. 11/491,052, filed on Jul. 20, 2006, and a continuation-in-part of application No. 11/474,033, filed on Jun. 23, 2006, and a continuation-in-part of application No. 11/506,729, filed on Aug. 18, 2006, and a continuation-in-part of application No. 11/506,661, filed on Aug. 18, 2006.

(51) Int. Cl.
*H04L 12/28* (2006.01)
(52) U.S. Cl. ...................... 370/392; 370/400
(58) Field of Classification Search ................. 709/224, 709/235; 370/392, 400; 726/23
See application file for complete search history.

(56) References Cited

U.S. PATENT DOCUMENTS 6,195,698 B1 2/2001 Lillibridge 6,393,568 B1 5/2002 Ranger (Continued)

FOREIGN PATENT DOCUMENTS

EP 1063833 A 12/2000

(Continued)

OTHER PUBLICATIONS

Maya Gokhale et al; "Granidt: Towards Gigabit Rate network Intrusion Detection Technology"; FPL 2002, Montpellier,France.

(Continued)

*Primary Examiner*—Jayanti K Patel
*Assistant Examiner*—Jung Park
(74) *Attorney, Agent, or Firm*—Garlick Harrison & Markison

(57) ABSTRACT

A communication infrastructure includes an intermediate routing node that routes a plurality of packets between a source device and a plurality of destination devices, a plurality of templates stored on the intermediate routing node and a service function. The intermediate routing node, e.g., a switch, router, access point, bridge, or gateway, identifies packets containing requests for a webpage, the requests being a service attack attempt by comparing the packet with the plurality of templates. Then, the intermediate routing node denies service attack by interacting with the server and client devices. That is, the intermediate routing node sends messages with challenge mechanism to the server, based on the response or otherwise, sends messages and anti-service attack downloads to the client devices and receives response.

22 Claims, 11 Drawing Sheets

U.S. PATENT DOCUMENTS

| | | | |
|---|---|---|---|
| 6,597,957 B1 * | 7/2003 | Beakley | 700/7 |
| 7,124,440 B2 * | 10/2006 | Poletto et al. | 726/23 |
| 2002/0007453 A1 | 1/2002 | Nemovicher | |
| 2002/0032880 A1 | 3/2002 | Poletto et al. | |
| 2002/0069370 A1 | 6/2002 | Mack | |
| 2002/0087885 A1 | 7/2002 | Peled | |
| 2002/0129140 A1 | 9/2002 | Peled | |
| 2002/0129237 A1 | 9/2002 | Radatti | |
| 2003/0172262 A1 | 9/2003 | Curry | |
| 2004/0003283 A1 * | 1/2004 | Goodman et al. | 713/201 |
| 2005/0050338 A1 | 3/2005 | Liang | |
| 2005/0050362 A1 | 3/2005 | Peles | |
| 2005/0210533 A1 | 9/2005 | Copeland | |
| 2005/0238005 A1 | 10/2005 | Chen et al. | |
| 2005/0251486 A1 | 11/2005 | Nair | |
| 2005/0278784 A1 | 12/2005 | Gupta | |
| 2006/0072582 A1 | 4/2006 | Bronnimann | |
| 2006/0075494 A1 | 4/2006 | Bertman | |
| 2006/0085528 A1 | 4/2006 | Thomas | |
| 2006/0095971 A1 | 5/2006 | Costea | |
| 2006/0130141 A1 * | 6/2006 | Kramer et al. | 726/23 |
| 2006/0174345 A1 | 8/2006 | Flanagan | |
| 2006/0248575 A1 | 11/2006 | Levow | |

FOREIGN PATENT DOCUMENTS

| | | | |
|---|---|---|---|
| EP | 1335559 A | 8/2003 | |
| EP | 1560398 A2 | 1/2005 | |
| EP | 1699204 A | 9/2006 | |
| KR | 2004 0102907 A1 | 12/2004 | |
| WO | WO 97/12321 A | 4/1997 | |
| WO | WO 0219639 A | 3/2002 | |
| WO | WO 2004/091158 A | 10/2004 | |
| WO | WO 2005/017708 A | 2/2005 | |

OTHER PUBLICATIONS

Dharmapurikar S. et al; "Deep Packet Inspection Using Parallel Bloom Filters"; IEEE MICRO, IEEE Service Center Los Alamitos, CA,US Jan. 2004.

Steve White, et al; "Anatomy of a Commercial-Grade Immune System"; Internet Citation, Jun. 1999 (XP-002310183).

Young H. Cho, et al; "A Pattern Matching Co-processor for Network Security"; DAC 05; Proceedings of the 42nd Annual Conf. on Design Automation Jun. 13, 2005.

Shanmugasundaram Kulesh et al; "Payload Attribution via Hierarchical Bloom Filters"; Proc ACM Conf Computer Commun Secur; Proceedings of the ACM Conf on Computer & Comm. 2004 (XP002453251).

CISCO; "Committed Access Rate"; Internet Citation 1999 (XP-002375164).

CISCO ISP Essentials; Internet Citation Jun. 6, 2001 (XP-002217477).

David Whyte, et al; "DNS-Based Detection of Scanning Worms in an Enterprise Network";Security Symposium, Feb. 4, 2005 (XP-002412148).

* cited by examiner

SWITCHING NETWORK EMPLOYING A USER CHALLENGE MECHANISM TO COUNTER DENIAL OF SERVICE ATTACKS

CROSS REFERENCE TO RELATED APPLICATIONS

The present application is a continuation-in-part of:

Utility application Ser. No. 11/429,477, filed on May 5, 2006, and entitled "PACKET ROUTING WITH PAYLOAD ANALYSIS, ENCAPSULATION AND SERVICE MODULE VECTORING";

Utility application Ser. No. 11/429,478, filed on May 5, 2006, now U.S. Pat. No. 7,596,137, and entitled "PACKET ROUTING AND VECTORING BASED ON PAYLOAD COMPARISON WITH SPATIALLY RELATED TEMPLATES";

Utility application Ser. No. 11/491,052, filed on Jul. 20, 2006, and entitled "SWITCHING NETWORK EMPLOYING VIRUS DETECTION";

Utility application Ser. No. 11/474,033, filed on Jun. 23, 2006, and entitled "INTERMEDIATE NETWORK NODE SUPPORTING PACKET ANALYSIS OF ENCRYPTED PAYLOAD";

Utility application Ser. No. 11/506,729 filed on Aug. 18, 2006, and entitled "SWITCHING NETWORK EMPLOYING ADWARE QUARANTINE TECHNIQUES"; and Utility application Ser. No. 11/506,661 filed on Aug. 18, 2006, and entitled "SWITCHING NETWORK EMPLOYING SERVER QUARANTINE FUNCTIONALITY", the complete subject matter of all of these are incorporated herein by reference in their entirety for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

This invention generally relates to communication infrastructures, and, more particularly, to switching node operations in a packet switched communication network.

2. Related Art

Internet networks are widely used today to communicate voice, video, and data packets across distant locations. An Internet infrastructure typically includes switching devices such as routers, switches, packet switched exchanges, access points and Internet service provider's networks (ISPN), Internet communication pathways and end point devices. Client devices used as end point devices include personal or laptop computers, servers, set top boxes and handheld data/communication devices, for example. Servers, typically, source web pages to a plurality of client devices, viewed using web browsers.

Some kind of malware codes that are intentionally introduced in to many client devices attack the servers by simultaneously (based on a system clock) attempting to send requests to a clean server computer to cause an overload. These attacks cause immense difficulties and losses to the users of both the servers and client devices. Often, client devices are incapable of eliminating such malware codes.

Users often purchase multiple malware processing packages as current packages often fail to address all of the ever increasing list of malware. Although sometimes free, most are expensive especially considering the multiple package burdens.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the Claims.

In accordance with the present invention, a communication infrastructure that routes a plurality of packets between a source device and a plurality of destination devices consisting of intermediate routing node, a plurality of templates stored on the intermediate routing node and a service function. The intermediate routing node receives a first of the plurality of packets containing a request for a web page, the request being a service attack attempt. Then, the intermediate routing node identifies the request for the web page by comparing the contents of the first of the plurality of packets with at least one of the plurality of templates. The intermediate routing node identifies the service attack attempt and the intermediate routing node responds to the identification of service attack attempt by triggering the service function.

In accordance with the present invention, an intermediate routing node in a communication infrastructure that routes a packet from a source device consisting a network interface, storage containing a plurality of templates and traffic data, and processing circuitry. The processing circuitry receives the packet containing a request for a web page, the request for the web page being a service attack attempt, compares the contents of the packet with at least one of the plurality of templates, and identifies the request for the web page. Then, the processing circuitry identifies the service attack attempt by using the traffic data and responds to request for the web page by triggering service function.

Features and advantages of the present invention will become apparent from the following detailed description of the invention made with reference to the accompanying drawings.

BRIEF DESCRIPTION OF THE DRAWINGS

FIG. 1 is a schematic block diagram illustrating an embodiment of a communication infrastructure built in accordance with the present invention, wherein intermediate packet pathway nodes process the webpage request packets from a plurality of client devices, directed toward a server, to deny malware induced service attacks;

DETAILED DESCRIPTION OF THE INVENTION

Figure 1:
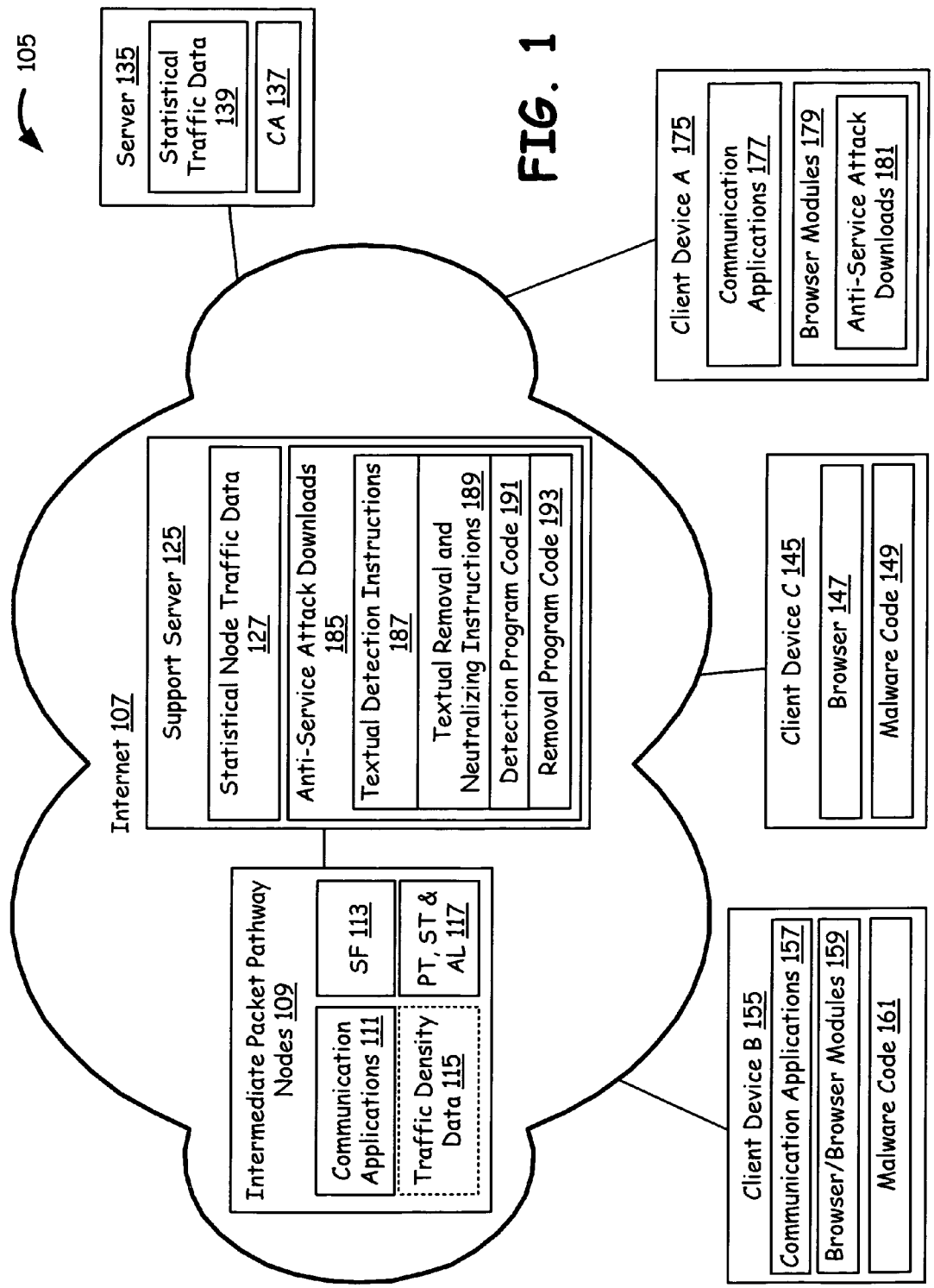
FIG. 1 is a schematic block diagram illustrating an embodiment of a communication infrastructure built in accordance with the present invention, wherein intermediate packet pathway nodes process packets containing webpage requests from a plurality of client devices, directed toward a server, to deny malware induced service attacks.

FIG. 1 is a schematic block diagram illustrating an embodiment of a communication infrastructure 105 built in accordance with the present invention, wherein intermediate packet pathway nodes 107 process packets containing webpage requests from a plurality of client devices 145, 155 and 175, directed toward a server 135, to deny malware induced service attacks. Malware code 149 and 161 triggered service attacks may occur at a predetermined time and date from a plurality of client devices such as the client devices A, B, and C 175, 155 and 145, in the form of requests for a specific webpage from the server 135. In accordance with the present invention, the intermediate packet pathway nodes 109, in conjunction with support server 125, which are part of an Internet network 107, provide assistance to the server 135 by detecting a service attack attempt in one of many ways described herein, and take a series of steps to deny such a service attack attempt.

A malware code may include a virus code or an adware code. For example, some adware often causes pop-up windows to a particular site to open. Motivations may be for click through dollars or to cause a denial of service attack. Such malware may be a virus or merely unwanted adware. For example, a malware may be a virus spreading from client device to client device that synchronizes an attack using internal clocks or an aggressive adware that causes a pop-up window to be loaded from a target server. Service attacks are automated malware induced requests for the webpage from the server 135. Hence, communication Applications (CA) such as 111, 137, 157 and 177 allow the intermediate packet pathway nodes 109, as a part of series of steps to deny of service attacks, interact with the server 135, and based on the response or otherwise, with the client devices 155 and 175, that includes human challenges to ensure human intervention. For detection of a service attack attempt, the intermediate packet pathway nodes 109 make use of built-in database or live traffic data such as traffic density data 115, or statistical node traffic data 127 (that is, the statistical traffic related data of the support server 125), the statistical traffic data 139 of the server 135. The intermediate packet pathway nodes 109 also contain Primary Templates, Secondary Templates and Associated Logic (PT, ST and AL) 117 and Service Functions (SF) 113 that assist in determining request for the webpage and the service attack attempt. In addition, the client devices 145, 155 and 175 may contain browser and/or browser modules such as 147, 159, and 179. Some of the client devices, such as the client device C 175, may also download anti-service attack downloads 181 from the support server 125, that help remove the malware code and block any such further attempts of service attacks. Some legacy client devices, such as the client device C 145, may not be facilitated with communication applications.

The names intermediate packet pathway node, intermediate routing node, intermediate node and network node are used interchangeably in the descriptions. In addition, the names source end point device, source device and server are used interchangeably and the names destination end point device, destination device and client device are used interchangeably. However, the support server 125 built in to the Internet network 107 assumes the responsibility of providing denial of service attack assistance to the intermediate nodes 109, based upon requests from the intermediate nodes 109 or the server 135. The support server also provides malware detection and removal assistance to the client devices 145, 155, 175, and server 135. The malware detection and removal assistance are provided in terms of anti-service attack downloads 185, at different levels such as providing: a) textual detection instructions 185; b) textual removal or neutralizing instructions 187; c) detection program code 191; and d) removal program code 193. These anti-service attack downloads 185 are provided when the possibility of service attacks are identified, as described with reference to the FIG. 3.

The detection of the service attack attempt begins with the intermediate nodes 109 identifying request for the webpage from the server 135. To identify a request for a webpage, the intermediate nodes 109 compare an arriving packet payload from one of the client devices 145, 155, or 175 with the primary templates that are locally available. The primary templates contain bit sequences that upon a successful match help determine if an arriving packet contains request for the webpage from the server 135. If such a determination is not possible by comparing the packet payload with the primary templates, the logic associated with the primary templates direct the packet to secondary templates. Comparisons similar to that of primary templates occur with respect to at least one of the secondary templates, and the associated logic may direct the packet to more comparisons with the secondary templates. Once a successful determination of the request for the webpage is completed, the application of associated logic with either primary or secondary templates helps determine if this request for the webpage is a service attack attempt.

To determine if the webpage request is a service attack attempt, the logic associated with either the primary templates or secondary templates direct the intermediate nodes 109 to follow one of the following methods: (a) compare the current traffic density with traffic density threshold for the current date and time set by the server 135, that may be available at the support server 125 or the intermediate nodes 109 themselves; (b) access statistical traffic data 139 for the current time and date automatically from the server 135 and compare with the current traffic density (specifically applicable if the intermediate node is closest to the server); (c)

access statistical node traffic data 127 for the current time and date automatically from the support server 125 and compare with the current traffic density; (d) use counting mechanism available in the associated logic of either primary or secondary templates; and/or (e) determine from the sudden upswing of traffic density at the node, by comparing with the traffic density data 115 stored at the intermediate nodes 109 for a short window of period before current time. The server 135 sets the threshold for traffic density automatically or by the users of the server 135 manually for each period of time, ahead of time. This data may be available at the server 135 itself or at the support server 125. To set threshold automatically, the server 125 may utilize the statistical traffic data 139 available at the server 135.

Once a service attack attempt is successfully determined, the intermediate nodes 109 interrupt any more requests for the webpage from the server 135. This is done by the logic associated with the primary or secondary templates, by invoking one or more service functions. The service functions in turn invoke communication applications 111 and 137, after interrupting any further webpage requests. Then, the communication applications 111 send messages with human challenge to the server 135 and expect a response in turn, before taking any further actions on the interrupted requests. The message may include a title such as "Service attack message/warning . . . !", and brief description of the situation encountered by the intermediate nodes 109. The description may, for example, be that—"The server (www.domainname.com) is experiencing above average requests for the webpage <<webpage pathname>> at <<current date and time>>. This may be a service attack attempt on the server, please choose one or more of the following options, and respond back quickly by entering the human challenge code." The selections provided for the users of the server 135 may include one or more of options of: (a) stop any further requests for the webpage; (b) send a message to the client devices explaining the current difficulties at the server, such as "We are experiencing technical difficulties at the server, please try later . . . "; (c) send a service attack message with a human challenge to the client devices to ensure that the webpage request is made by the users of the client devices; (d) create a pathway for the webpage requests to another server, for example, requests from a specific region; and/or (e) change threshold at the support server or the intermediate nodes to another value.

The choice (a) allows the intermediate nodes 109 to simply drop any more requests for the webpage. The selection of choice (d) allows the intermediate nodes to change the server address in the packets and divert traffic to another server. This choice may be applied to the traffic coming from a certain region, by allowing the users of the server 135 to provide region based IP addresses. For example, a particular geographical location may have IP address xxx.xxx.yyy.yyy, where, the first two portions of the IP address (that is, xxx.xxx) define a geographic region. Changing the threshold at the support server 125 or the intermediate nodes 109, in choice (e) provides the users of the server 135 an option to allow an increase of the webpage related traffic for specific period of time. This may be useful, for example, during special occasion such as a business advertisement campaign, an election, or a sports event.

Upon selection of choice (c), the intermediate nodes 109 send a service attack message to the client devices 145, 155 and 175. The service attack message that a client device 145, 155 or 175 receives may include a title such as "Service attack message . . . !", and a brief description encountered by the intermediate nodes 109 and the server 135. The description may, for example, be that—"Your system is attempting to access server (www.domainname.com) during a heavy traffic period. The reason for heavy traffic may be a malware induced service attack. To ensure that you are making this request and not a malware code, we provide you a human challenge. Please enter the code given below and click on 'yes' button. If you would try to access this webpage at a later time, click on 'no' button". In addition, the message may also include anti-service attack download links to assist the users of the client devices 145, 155 and 175 to remove the malware.

The human challenge ensures a human response from the users of the client devices 145, 155, and/or 175. The human challenge may include few digits or alphabets with orientations unlike alphanumeric displays of the computer, and a human user is expected to respond by keying in these alphanumeric characters and give approval for transmission of such packets. During an unexpected surge in traffic, this procedure allows the intermediate nodes 109 to make sure the webpage requests are from the users of the client devices alone and not a malware induced service attack. Along with the human challenge mechanism, the intermediate network nodes 109 may also collect some user information if necessary. Further, intermediate nodes 109 may send messages, information, warning and assistance (in the form of anti-service attack downloads) regarding the malware, together with the challenge mechanism.

The intermediate nodes 109 accomplish the service attack processing in such a manner as to not unnecessarily repeat any of these processes along the communication path. This non-repetitive processing is done by including a comparison table version code in the packets, after the service attack processing is done. The comparison table version code incorporates information about primary and secondary templates that are compared on the packet, and the service functionality used on the packet by a previous node. Information contained in the comparison table version code may include the template version, associated logic version, local service function versions, and the service functions applied locally or remotely. If any of the nodes in the communication path contains an enhanced or a recent version of templates, for example, the node may determine the need of comparison with only those enhanced templates. Similar considerations apply to associated logic and service functions. If the comparison table version code does not exist in the packet, then the processing intermediate node determines that packet analysis has not taken place by any of the previous nodes. On the contrary, if the comparison table version code does exist, then the processing intermediate node decodes the code to determine the service attack processes that have occurred before. Then, if any further service attack processing is necessary only such processing are done.

To perform service attack processing mentioned above, the intermediate nodes 109 may decrypt packets if they are encrypted, and may invoke a local or remote service for such a decryption process. If the packets that arrive at a processing intermediate node are encrypted and if further analysis is indicated, then, network node proceeds with decryption of the packet. While the public key may be available either from the server 135 or the client device 145, 155 or 175, the private key is known only to the client device 153.

In addition to denying service attacks, the intermediate nodes 109 and the support server 125 also handle situations involving very high, unexpected volume. The service functions 113 may send messages such as "please try again later" in these situations. This unsupportable volume is determined based upon the server's processing and communication bandwidth.

Figure 2:
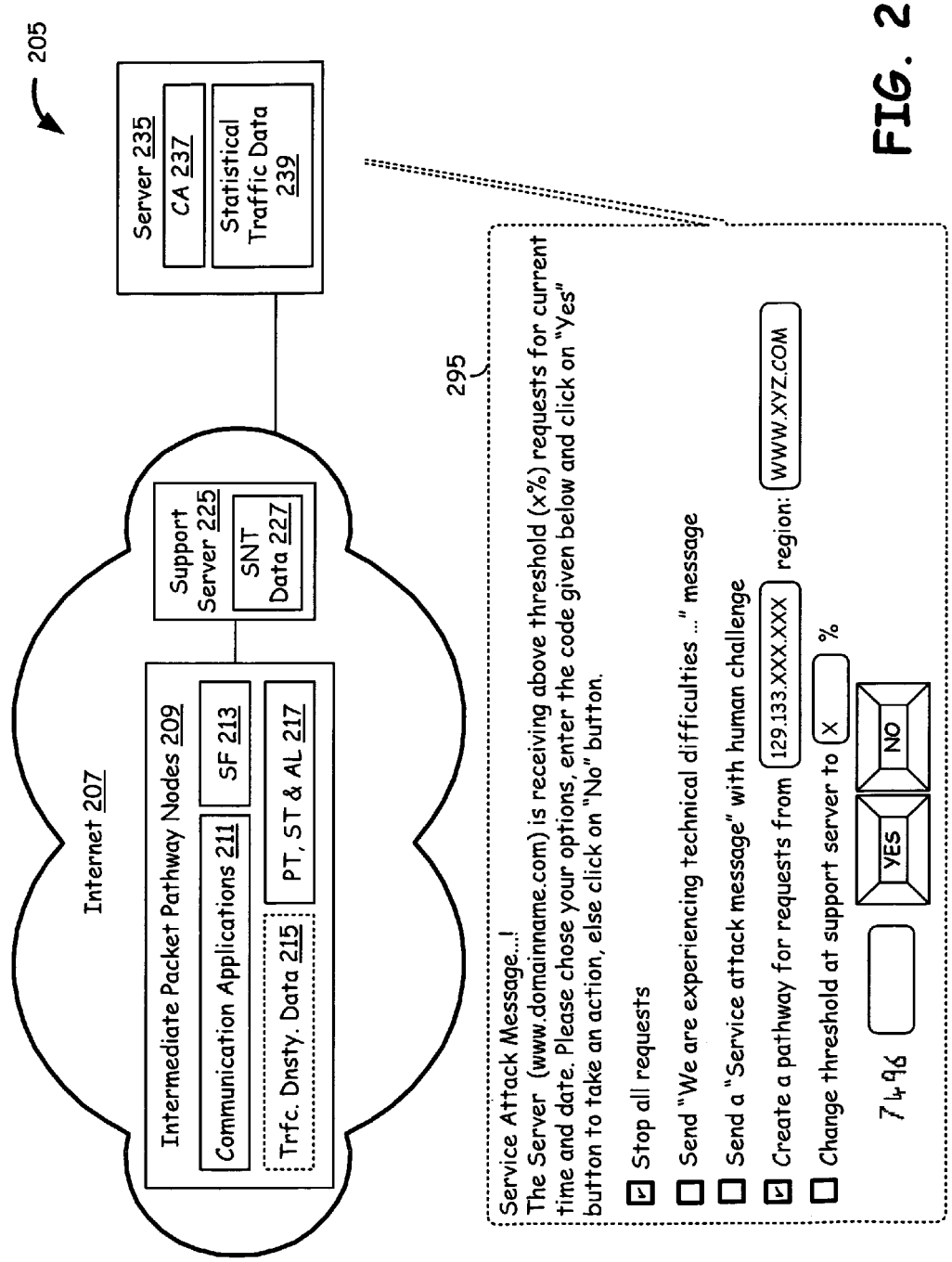
FIG. 2 is a schematic block diagram illustrating functionality of communication applications distributed between the sever and the intermediate packet pathway nodes of the communication infrastructure of FIG. 1, according to the present invention.

FIG. 2 is a schematic block diagram 205 illustrating functionality of communication applications 211 and 237 distributed between the sever 235 and the intermediate packet pathway nodes 209 of the communication infrastructure of FIG. 1, according to the present invention. The server 235 includes communication applications 237, that work in conjunction with communication applications 211 of the intermediate nodes 209, which exist in Internet backbone 207, to deny service attack on the server 235. The communication applications 211 and 237 perform to present messages relating to service attack, and gather response from the server 235, which help the intermediate nodes 209 determine a response for a service attack attempt. The statistical data for denial of service attack response from the intermediate nodes 209 are obtained from either the traffic density data 215 that are available locally, or from SNT Data (Statistical Node Traffic Data) 239 of a support server 225, or from Statistical Traffic Data 239 of the server 235. In addition, Primary Templates, Secondary Templates and Associated Logic (PT, ST and AL) 217 and Service Functions (SF) 213 assist the intermediate nodes 209 in determining request for a webpage from the server 235 and denying service attack on the server 235.

When a service attack is attempted on the server 235, and such an attempt is identified by the intermediate nodes 209, the communication applications 211 and 237 perform to obtain a response from the users (or managers) of the server 235, before taking any further action. To obtain response from the users of the server 235, the intermediate nodes 209 send message to the server 235. The message may include a title such as "Service attack message . . . !", and brief description of the situation encountered by the intermediate nodes 209. The description may say: "The server (www.domainname.com) is receiving above threshold (x %) requests for the current time and date. Please choose your options, enter the code given below and click on 'Yes' button to take an action, else click on 'No' button to ignore . . . " The selections provided for the users of the server 235 may include one or more of options of: (a) stop all requests; (b) send "We are experiencing technical difficulties at the server, please try later . . . " message; (c) send a "Service Attack Message" with a human challenge; (d) create a pathway for the requests from <<xxx.xxx.xxx.xxx>> region to <<xxx.xyz.com>>; and/or (e) change threshold at the support server <<x>%.

The selection (a) allows the intermediate nodes 209 simply to drop any more packets containing requests for the webpage. The selection (b) sends a message to corresponding client device (355 of FIG. 3), upon request for the webpage, that there are some technical difficulties at the server 235, as described with reference to the FIG. 3. The selection (c) sends a message to the client device with a human challenge and obtains response from the client device, to ensure that the request is from the users of the webpage. For more details on the service attack message sent to the client device, refer to the description of FIG. 3. The selection of choice (d) allows the intermediate nodes to change the server address in the packets and divert the webpage related traffic to another server. This choice may be applied to the traffic coming from a certain region, by allowing the users of the server 235 to provide portions of the IP addresses. For example, a particular geographical location may have IP address 129.133.xxx.xxx, where, the first two portions of the IP address define a geographic region. Changing the threshold at the support server 225 or the intermediate nodes 209, in choice (e) provides the users of the server 235 an option to allow an increase of the webpage related traffic for specific period of time. This may be useful, for example, during special occasion such as a business advertisement campaign, an election or a sports event.

Figure 3:
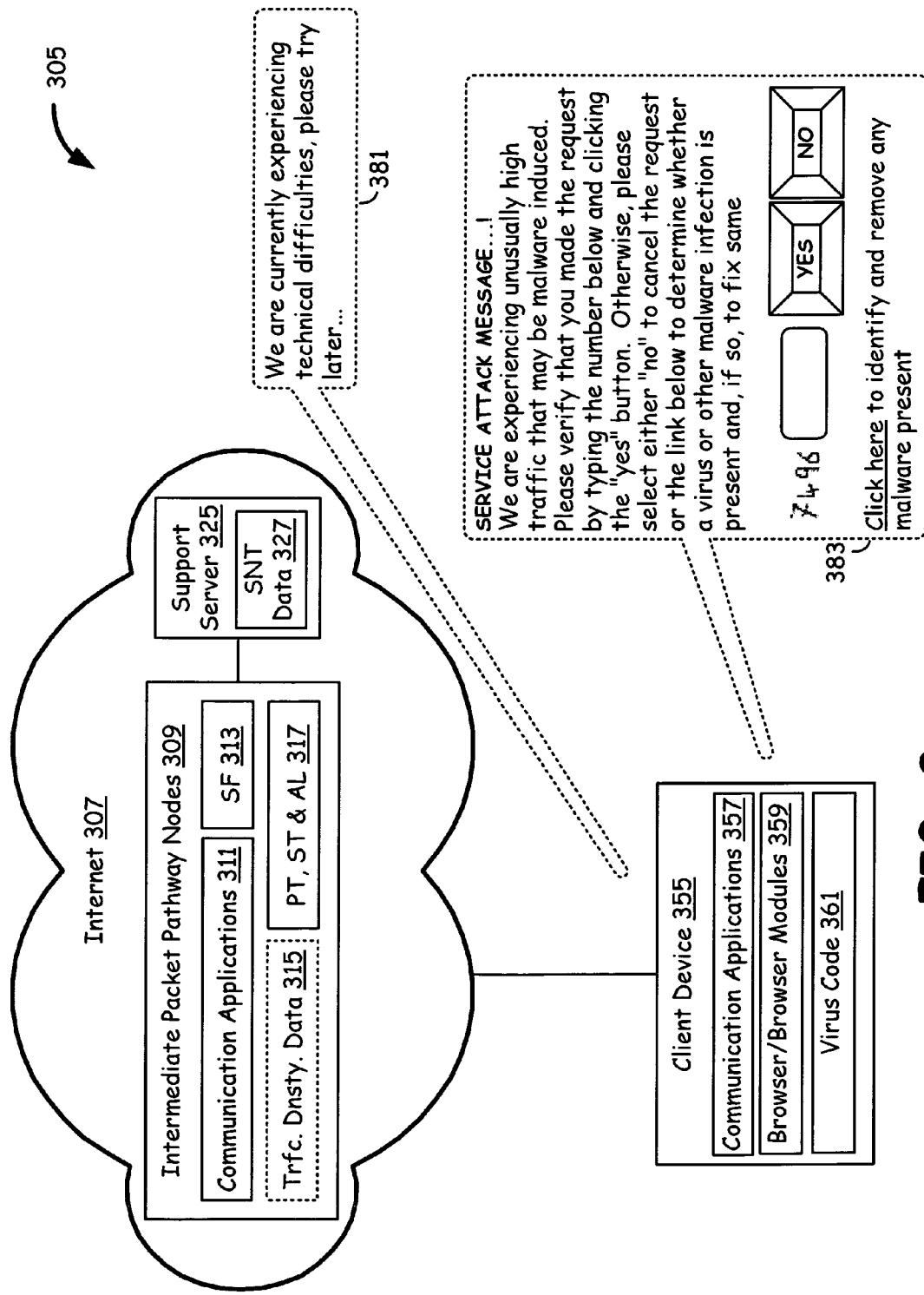
FIG. 3 is a schematic block diagram illustrating functionality of communication applications distributed between one of the client devices and the intermediate packet pathway nodes of the communication infrastructure of FIG. 1, according to the present invention.

FIG. 3 is a schematic block diagram 305 illustrating functionality of communication applications 311, 357 distributed between a client device 355 and intermediate packet pathway nodes 309 of the communication infrastructure of FIG. 1, according to the present invention. The client device 355 contains communication applications 357 that work in conjunction with communication applications 311 of the intermediate nodes 309, which exist in Internet backbone 307, to present messages relating to service attack issues and obtain response from the client device 355. The communication applications 311 and 357 also assist the client device 355 by providing links and/or anti-service attack downloads. The client device 355 also contains browser modules 359, which assists the browser with add-on functionalities. The browser modules 359 further consists of anti-service attack downloads that help remove malware code 361. In addition, Primary Templates, Secondary Templates and Associated Logic (PT, ST and AL) 317 and Service Functions (SF) 313 assist the intermediate nodes 309 in determining request from the client device 355 for a webpage and denying service attack on server.

Figure 4:
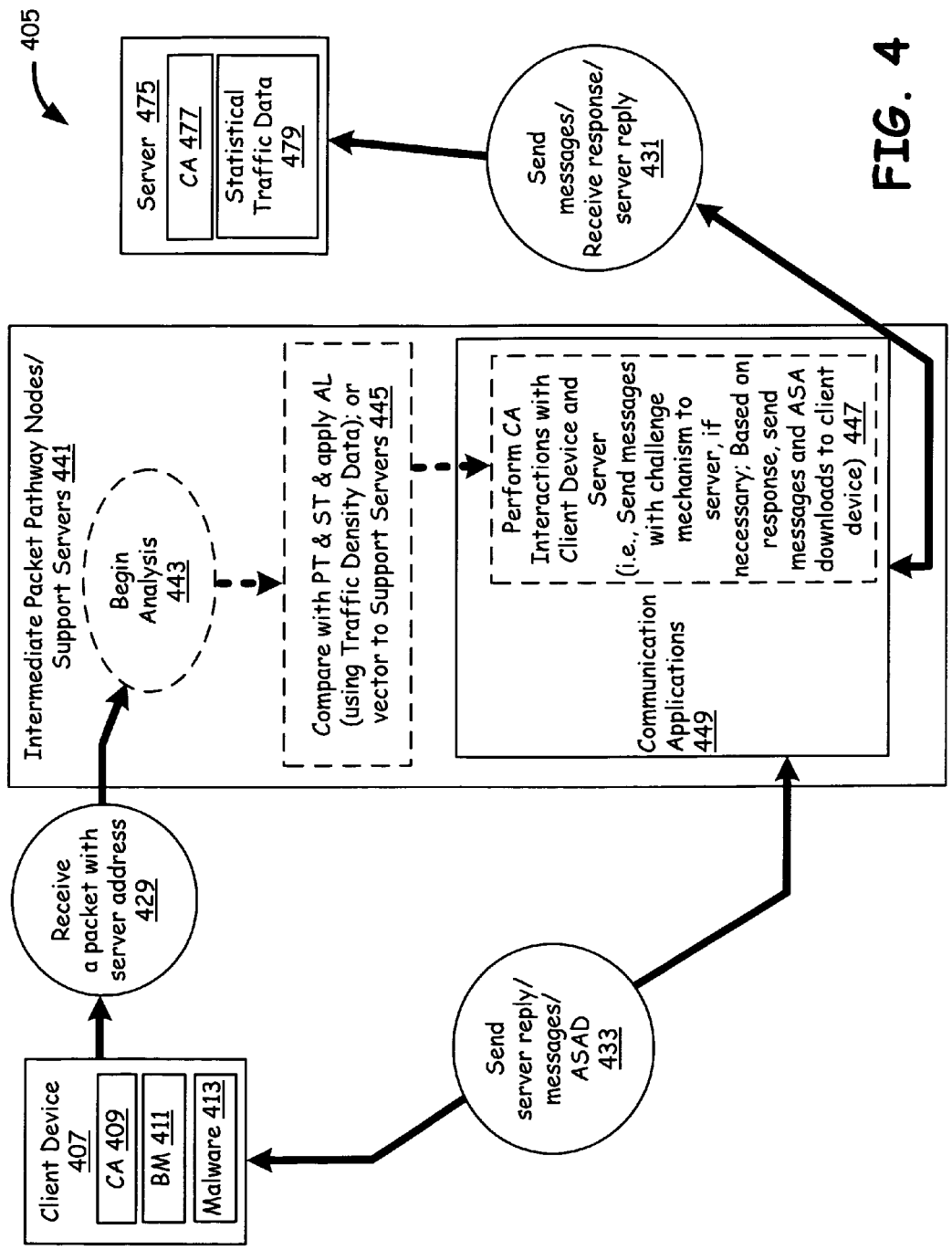
FIG. 4 is a schematic block diagram illustrating interactions between the communication applications incorporated into server and client devices, and intermediate packet pathway nodes in the communication infrastructure of FIG. 1, in accordance with the present invention.

When a service attack is attempted by the client device 355, and such an attempt is identified by the intermediate nodes 309, the communication applications 311 and 357 perform to obtain a response from the users of the client device 355, depending upon the server's selections, as described with reference to the FIG. 2. The service attack message sent to the client device 355 may include a title such as "Service attack message . . . !", and a brief description encountered by the intermediate nodes 309. The description may, for example, say: "We are experiencing unusually high traffic that may be malware induced. Please verify that you made the request by typing the number below and clicking the "yes" button. Otherwise, please select either "no" to cancel the request or the link below to determine whether a virus or other malware infection is present and, if so, to fix same." In addition, the message may also include anti-service attack download links to assist the users of the client device 355 to remove the malware. These links are provided with the above mentioned message, such as "Click here to identify and remove any malware present." By clicking the link, the intermediate nodes 309 or support server 325 offer either textual instructions on how to identify and remove, or may offer to download program code (e.g., java code) for the search and removal process. FIG. 4 is a schematic block diagram 405 illustrating interactions between the communication applications 409, 449 and 477 incorporated into server 475 and client device 407, and intermediate packet pathway nodes and/or support servers 441 in the communication infrastructure of FIG. 1, in accordance with the present invention. Specifically, the illustration shows interaction between elements of the communication infrastructure containing a plurality of intermediate packet pathway nodes (in short, intermediate nodes) and/or support servers 441, a server (or, source device) 475 and a client device 407 (which might be the client device B 155 or C 175 of FIG. 1). The server 475 contains components such as communication applications 477 and statistical traffic data 479. The client device 407 consists of communication applications 409, browser modules 411 and may also contain malware code 413 that initiates a service attack. The statistical traffic data 479 may be a database table containing traffic related data and statistics.

The interaction begins when the client device 407 communicates a request for a webpage to the server 475, via intermediate nodes 441. The intermediate nodes 441 receive such a packet with server address 429 and begin analyzing the packet containing request 443. The intermediate nodes 441 compare the received packet payload containing request for the webpage with PT and ST (Primary Templates and Secondary Templates) and apply AL (Associated Logic) 445. The logic associated with primary or secondary templates use traffic density data available at the intermediate nodes 441 to make such a determination that the received request for the webpage is a service attack attempt. Alternatively, the intermediate nodes may vector the packet to support server to analyze the packet containing webpage request, for a service attack. The logic associated with primary and secondary templates may then direct the communication applications 449 to perform interactions 447, 431 with the server 475 and based on the response send service attack messages and anti-service attack downloads 447, 433 to the client device 407.

The intermediate nodes and/or support server 441 fully protect the server 475 against a virus or other malware, when they are detected. For example, the intermediate nodes and/or support server 441 stops or at least interrupts each and every packet with a destination address of the server 475. This action taken by the intermediated nodes and/or support server 441 is dependent on the setting associated with a checkbox described with reference to the FIG. 2. To avoid repeated human challenges to the client device 407 in a single session, a permitted session ID may is delivered to the browser (one that has been modified to support this functionality, with browser modules 411) after a first human challenge. Thereafter, browser would include the session ID in each packet and the intermediate nodes and/or support server 441 would not interrupt the underlying flow.

Figure 5:
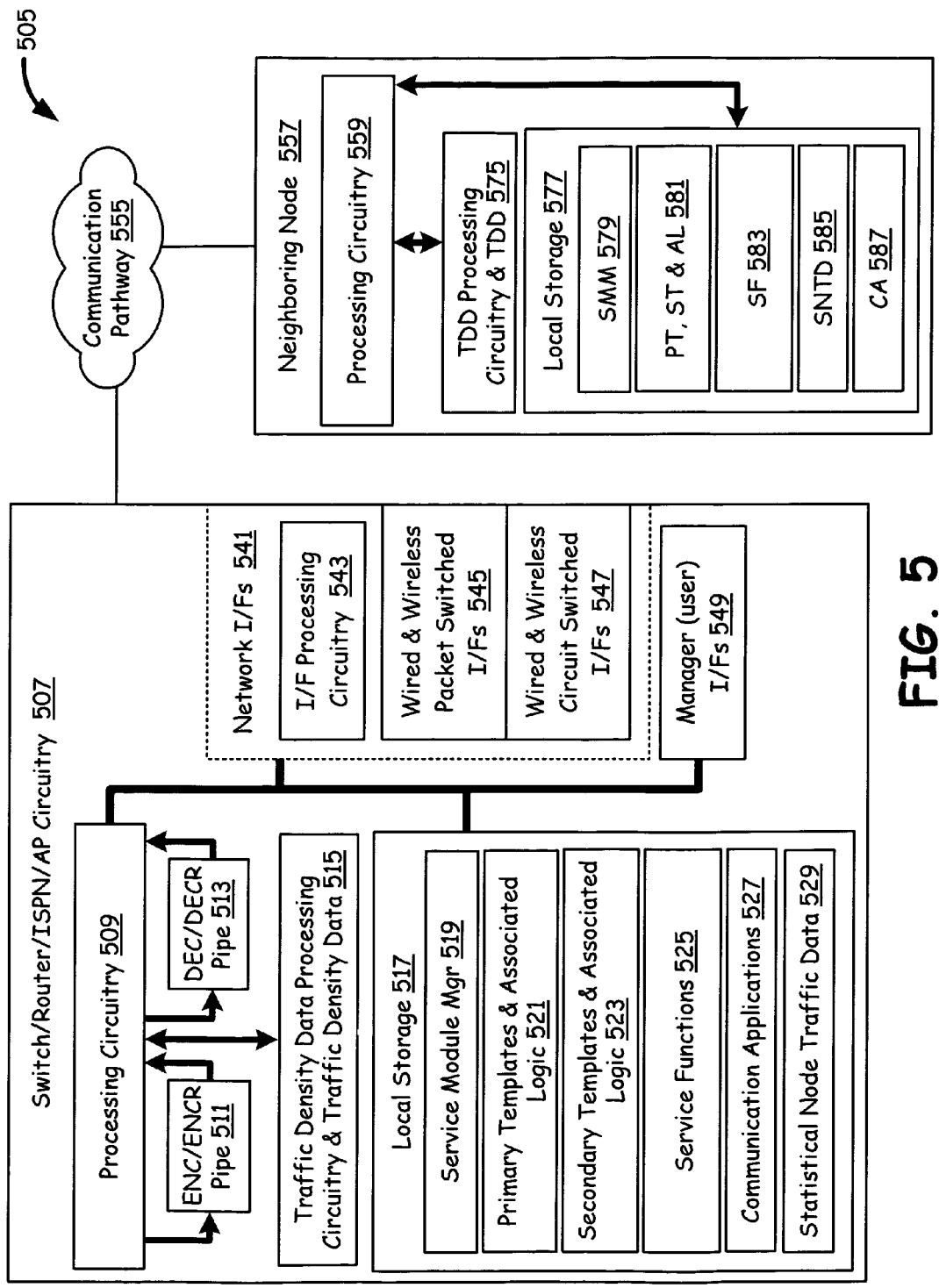
FIG. 5 is a schematic block diagram illustrating a network node (switch/router/ISPN/AP) constructed in accordance with the embodiment of FIG. 1 of the present invention.

FIG. 5 is a schematic block diagram 505 illustrating a network node (switch/router/ISPN/AP) 507 constructed in accordance with the embodiment of FIG. 1 of the present invention. In addition, the illustration shows a communication pathway 555 that communicatively couples the network node 507 to a neighboring node 557, which has similar quarantine processing capabilities. The network node circuitry 507 may represent any of the Internet nodes that route data packets and the circuitry may in part or full be incorporated in any of the network devices such as a switch, router, and ISPN or access point. The network node circuitry 507 generally includes processing circuitry 509, local storage 517, manager interfaces 549, and network interfaces 541. These components communicatively coupled to one another via one or more of a system bus, dedicated communication pathways, or other direct or indirect communication pathways. The processing circuitry 509 may be, in various embodiments, a microprocessor, a digital signal processor, a state machine, an application specific integrated circuit, a field programming gate array, or other processing circuitry. The processing circuitry 509 communicatively couples to an encoding/encryption pipe 511, a decoding/decryption pipe 513, and traffic density data processing circuitry and traffic density data 515. These hardware components 511, 513 and 515 may be hard-wired to increase the speed of service attack processing and routing.

Local storage 517 may be random access memory, read-only memory, flash memory, a disk drive, an optical drive, or another type of memory that is operable to store computer instructions and data. The local storage 517 contains Service Module Manager (SMM) 519 that analyses incoming packets by comparing the header contents and payload contents with appropriate templates. These templates and associated logic include primary templates and associated logic 521, secondary templates and associated logic 523. If any match is found during the primary template comparison, the associated logic directs the packets to selected groups of secondary templates for further analysis and after secondary template comparison, the logic associated with secondary templates is applied. This process is repeated until a conclusion is reached. The conclusion reached determines that the received packet contains request for a webpage and that it is a service attack attempt. Then, appropriate service functions 525 or remote quarantine service functions (not shown, may be available in support server of FIG. 1 or other intermediate nodes) are applied. The communication applications 527 allow messages and human challenge to be displayed on the screen, such as a popup, without a browser. The storage 517 also contains statistical node traffic data 529 that contains additional statistical data regarding node traffic to various servers and web pages.

The network interfaces 541 contain wired and wireless packet switched interfaces 545, wired and wireless circuit switched interfaces 547. In addition, the network interfaces 541 may also contain built-in or an independent interface processing circuitry 543. The network interfaces 541 allow network devices to communicate with other network devices and allow processing circuitry 509 to receive and send packets, which may contain request for a webpage. The network interfaces 541 allow utilization of external service functions for analysis and processing, when such functions are not available in the local storage 517. The manager interfaces 549 may include a display and keypad interfaces. These manager interfaces 549 allow the user at the network exchanges to control aspects of the present invention.

In other embodiments, the network node 507 of the present invention may include fewer or more components than are illustrated as well as lesser or further functionality. In other words, the illustrated network device is meant merely to offer one example of possible functionality and construction in accordance with the present invention. Other possible embodiment of network nodes is described with reference to the FIG. 7.

The network node 507 is communicatively coupled to external network devices, such as neighboring node 557 or support servers (not shown), via communication pathway 555. The neighboring node 557 may also consist of elements of present invention such as traffic density data processing circuitry and traffic density data 575, local storage 577, SMM (Service Module Manager) 579, PT, ST & AL (Primary Templates, Secondary Templates and Associated Logic) 581, SF (Service Functions) 583, SNTD (Statistical Node Traffic Data) 585 and CA (Communication Applications) 587. Further, the neighboring node 557 may have other components of the network node 507 such as an encryption pipe and decryption pipe (not shown).

The network node 507 begins analysis by comparing the packet contents, with a plurality of primary templates. By such primary template comparisons, the node 507 determines if the packet contains request for a webpage and if it contains, if it is a service attack attempt. When a match occurs, the node 507 applies logic associated with the primary templates. This, in turn, may lead to secondary template comparisons, where the packet payload contents are compared with a selected group of secondary templates. Then, the logic associated with secondary templates are applied. The process of secondary template comparisons and applying associated logic is repeated until a conclusion regarding the request for a webpage and service attack attempt is arrived. Then, service functions are applied on the packet by utilizing locally available service functions 525 or externally available SFs such as the SF 583 by vectoring the packet to the neighboring node 557.

Once a service attack attempt is successfully determined, any more requests for the webpage are interrupted by the intermediate node 507. This is done by the logic associated with the primary or secondary templates invoking one or more service functions 525. The service functions may invoke communication applications 527, after interrupting any further webpage requests, and send messages with human challenge to the server (135 of FIG. 1) and expect a response in turn, before taking any further actions on the interrupted requests. Then, the intermediate node 507 send a service attack message to the client device (145, 155, or 175 of FIG. 1). The service attack message that the client device receives may include a title such as "Service attack message . . . !", and a brief description encountered by the intermediate node 507 and the server.

Figure 6:
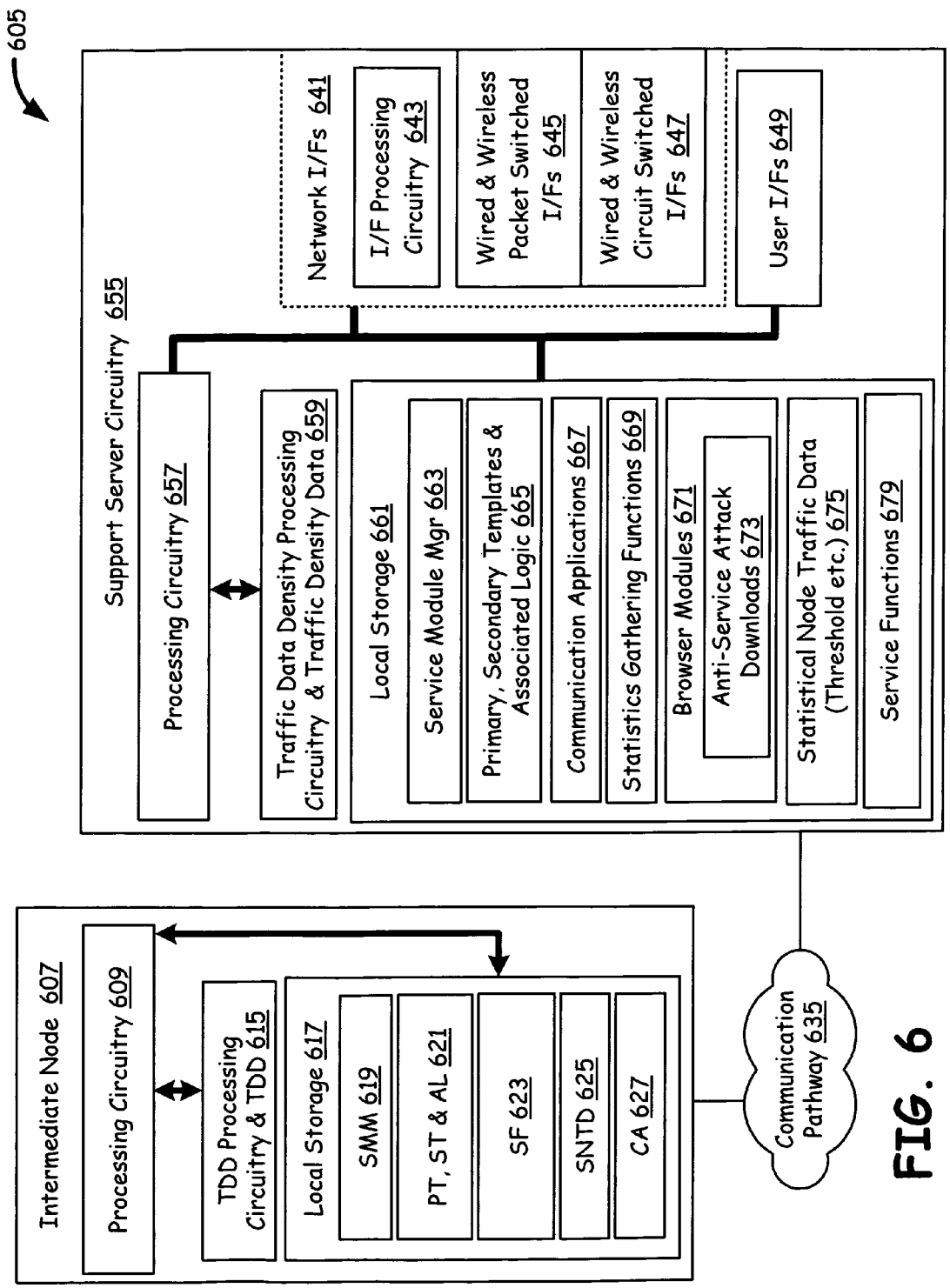
FIG. 6 is a schematic block diagram illustrating a support server constructed in accordance with the embodiment of FIG. 1 of the present invention.

FIG. 6 is a schematic block diagram 605 illustrating a support server 655 constructed in accordance with the embodiment of FIG. 1 of the present invention. The support server circuitry 655 performs some or all of the service attack processing such as detection of webpage requests in packets, determining whether this is a service attack attempt, performing communication application processes on the webpage packet, the server and client device, and gathering and analyzing statistical traffic data regarding a plurality of servers. The support server circuitry 655 generally includes processing circuitry 657, local storage 661, user interfaces 649, and network interfaces 641. These components communicatively coupled to one another via one or more of a system bus, dedicated communication pathways, or other direct or indirect communication pathways. The processing circuitry 657 may be, in various embodiments, a microprocessor, a digital signal processor, a state machine, an application specific integrated circuit, a field programming gate array, or other processing circuitry. The processing circuitry 657 is communicatively coupled to a traffic density data processing circuitry and traffic density data 659.

Local storage 661 may be random access memory, read-only memory, flash memory, a disk drive, an optical drive, or another type of memory that is operable to store computer instructions and data. The local storage 661 contains elements of the present invention such as a service module manager 663, primary, secondary templates and associated logic 665, communication applications 667, statistics gathering functions 669, browser modules 671 and statistical node traffic data (such as traffic density threshold data) 675 and service functions 679. The browser modules 671 further contains anti-service attack downloads 673. The malware detection and removal assistance are provided by providing anti-service attack downloads 673, at different levels such as providing: a) textual detection instructions; b) textual removal or neutralizing instructions; c) detection program code; and d) removal program code. These anti-service attack downloads 673 are provided when the possibility of service attacks are identified.

The service attack processing performed by the support server circuitry 655 is similar to that of a network node described with reference to the FIG. 5 and begins with packet contents being compared with primary templates. If any match is found during the primary template comparison, the associated logic directs the packets to selected groups of secondary templates for further analysis, if necessary, and after secondary template comparison, the logic associated with secondary templates is applied. This process is repeated until a conclusion is reached. Then, appropriate service functions 679 are applied. Once a service attack attempt is confirmed, the service attack processing begins. As a part of service function applications, the communication applications 667 send messages to server and client devices, and send statistical data gathering screens with human challenge to be presented on the screen, such as a popup, with or without a browser. The statistics gathering functions 669 may also work automatically, in conjunction with statistical traffic data of server to gather statistical traffic data regarding a webpage in the server.

The network interfaces 641 contain wired and wireless packet switched interfaces 645, wired and wireless circuit switched interfaces 647. In addition, the network interfaces 641 may also contain built-in or an independent interface processing circuitry 643. The network interfaces 641 allow network devices to communicate with other network devices, servers and client devices. The user interfaces 649 may include a display and keypad interfaces. These user interfaces 649 allow the user to control aspects of the present invention at the support server 655, such as aspects of manual/automatic/semiautomatic statistical data gathering and analysis, aspects of primary and secondary templates and associated logic etc.

In other embodiments, the support server circuitry 655 of the present invention may include fewer or more components than are illustrated as well as lesser or further functionality. In other words, the illustrated support server circuitry 655 is meant merely to offer one example of possible functionality and construction in accordance with the present invention.

The support server circuitry 655 is communicatively coupled to external network devices, such as an intermediate node 607 via a communication pathway 635. The intermediate node 607 contains a processing circuitry 609, local storage 617 and TDD processing circuitry and TDD 615. The local storage 617 further contains SMM (Service Module Manager) 619, PT, ST & AL (Primary Templates, Secondary Templates and Associated Logic) 621, SF (Service Functions) 623, SNTD (Statistical Node Traffic Data) 625 and CA (Communication Applications) 627. The intermediate node 607 may have other components such as an encryption pipe and decryption pipe (not shown).

The support server 655 has three primary functions: (a) gathering traffic related data and statistics related to nodes and servers; (b) providing secondary templates and logic to complete detection of service attack attempts; and (c) generate and distribute templates and logic to the intermediate nodes, based on gathered and analyzed traffic related data and statistics wherein the generation is done either manually, fully automatic, or automatic with manual confirmation and editing. Automatic generation of templates and logic is done by the communication applications (that participate in the statistical data gathering process by interacting with an end user), such as 627.

Figure 7:
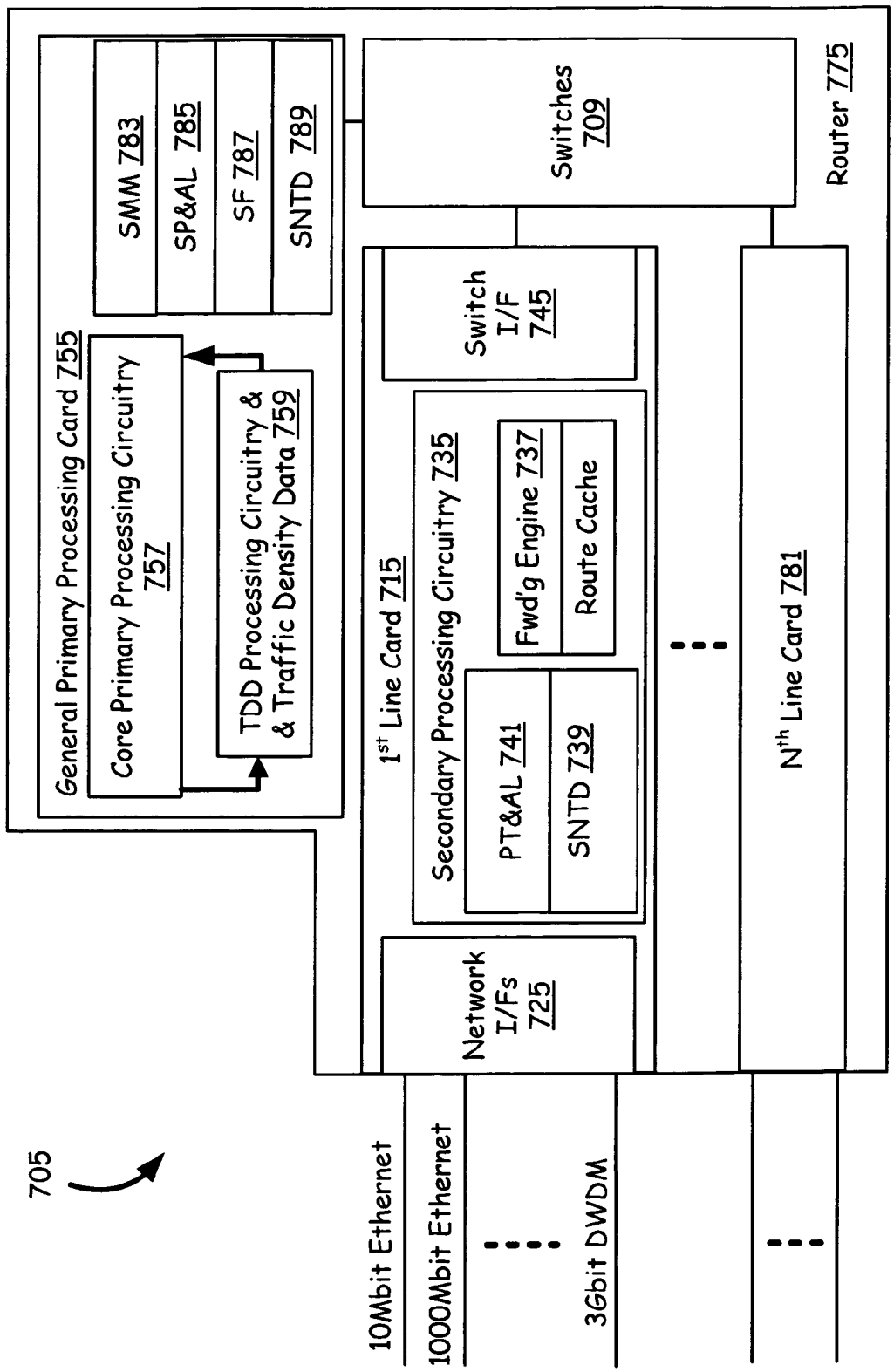
FIG. 7 is a schematic block diagram illustrating a router constructed in accordance with the embodiment of FIG. 1 of the present invention.

FIG. 7 is a schematic block diagram 707 illustrating a router 775 constructed in accordance with the embodiment of FIG. 1 of the present invention. The router 775 may be a packet switching exchange or access point. The router circuitry 775 generally includes general primary processing card 755, switches 709, and plurality of line cards 715 and 781. The line cards 715 and 781 may all be different in certain cases. The first line card 715 consists of network interfaces 725 capable of interfacing with wired and wireless networks such as 10 bit, 1000 Mbit Ethernet networks, and 5 Gbit DWDM (Dense Wavelength Division Multiplexing) fiber optic networks. The first line card 715 also contains switch interfaces 745 that allow the card to interface with interconnecting switches 709. In addition, the first line card 715 consists of secondary processing circuitry 735, which preprocesses the packets before interconnecting switches 709 route the packets. The secondary processing circuitry 735 contains forwarding engine 737 and route cache. The secondary processing circuitry 735, in addition to preprocessing the packets, also contains PT & AL (Primary Templates and Associated Logic) 741. The incoming packets are initially compared with primary templates and associated logic is applied. If a match occurs for a webpage request and service attack attempt, the packet is vectored to general primary processing card 755 for further processing. The secondary processing circuitry 735 may also contain statistical node traffic data 739 and local service functions, for quick service attack processing.

The general primary processing card 755 consists of core primary processing circuitry 757, which is communicatively coupled to a TDD (Traffic Density Data) processing circuitry and traffic density data 759. The general primary processing card 755 also contains service module manager (SMM) 783, SP & AL (Supplementary Templates and Associated Logic) 785, SF (Service Functions) 787 and SNTD (Statistical Node Traffic Data) 789. The SMM 783 in conjunction with SP & AL 785 and SF 787 perform secondary analysis and processing for a webpage request and service attack attempt, if vectored by the first line card 715.

Figure 8:
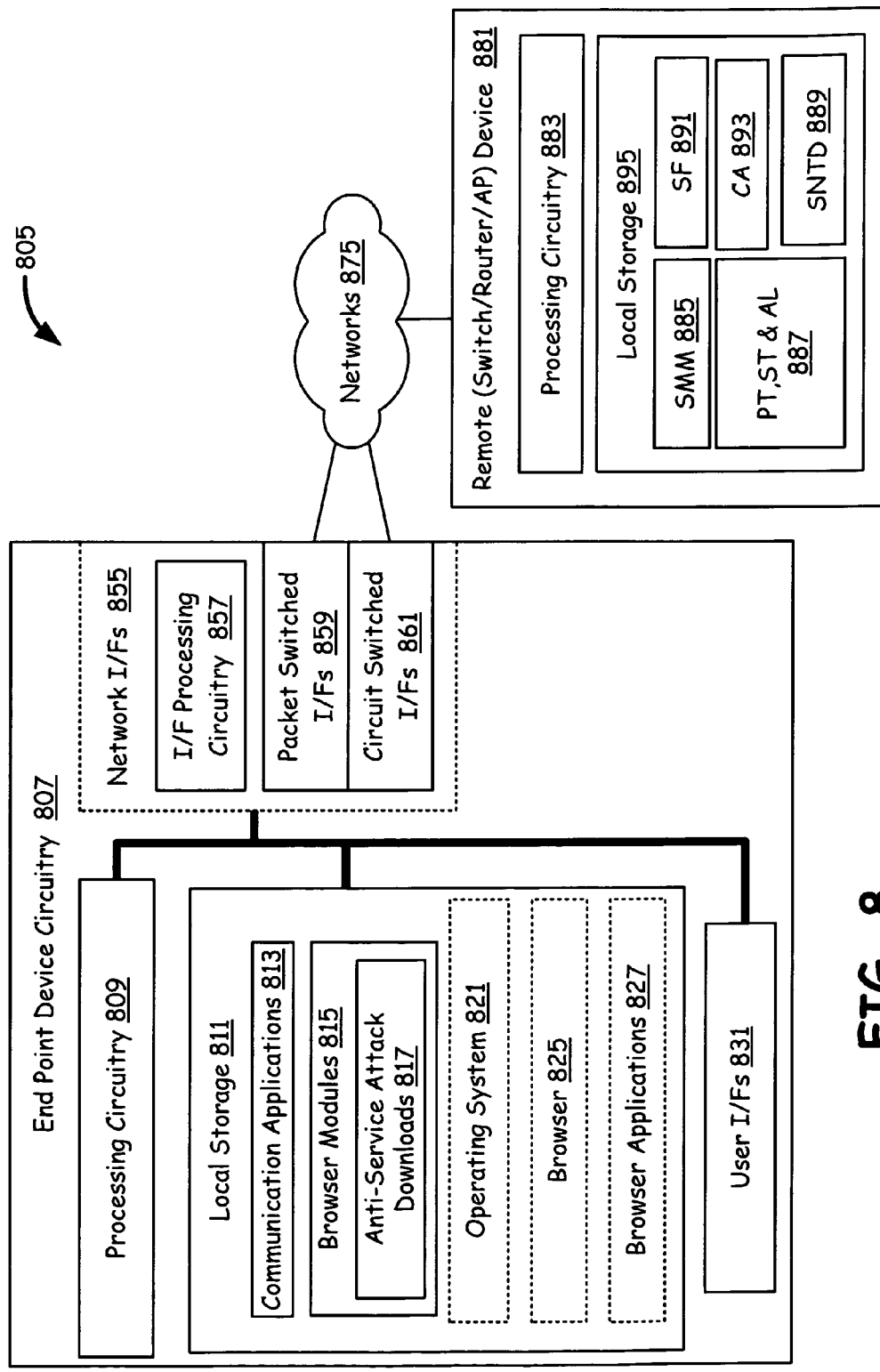
FIG. 8 is a schematic block diagram illustrating end point devices (server and/or client devices) constructed in accordance with the embodiments of FIG. 1 of the present invention.

FIG. 8 is a schematic block diagram 805 illustrating end point devices (server and/or client devices) 807 constructed in accordance with the embodiments of FIG. 1 of the present invention. The end point device circuitry 807 may refer to any of the device circuitry from which packets originate and/or terminate, and the circuitry may in part or full be incorporated in any of the end point devices described with reference to the FIGS. 1, 2, 3 and 4. The end point device circuitry 807 generally includes processing circuitry 809, local storage 811, user interfaces 831, and network interfaces 855. These components communicatively coupled to one another via one or more of a system bus, dedicated communication pathways, or other direct or indirect communication pathways. The processing circuitry 809 may be, in various embodiments, a microprocessor, a digital signal processor, a state machine, an application specific integrated circuit, a field programming gate array, or other processing circuitry.

The network interfaces 855 may contain wired and wireless packet switched interfaces 859, wired and wireless circuit switched interfaces 861 and the network interfaces 855 may also contain built-in or an independent interface processing circuitry 857. The network interfaces 855 allow end point devices to communicate with any other end point devices. The user interfaces 831 may include a display and keypad interfaces.

Local storage 811 may be random access memory, read-only memory, flash memory, a disk drive, an optical drive, or another type of memory that is operable to store computer instructions and data. The local storage 811 includes communication applications 813 and browser modules 815. The local storage 715 also contains browser applications 827, and an operating system 821 and browser 825. The browser applications 827 are capable of executing or interpreting downloaded anti-service attack downloads 817 that help remove malware code and educate the users about malware and fix malware service attack related problems. These downloads 817 may be made available by the network nodes, such as 881, when they detect a service attack attempt in a packet that either originate or destined to the end point device circuitry 807. The communication applications 813 allow messages and human challenge to be displayed on the screen, such as a popup, without a browser.

In other embodiments, the end point device circuitry 807 of the present invention may include fewer or more components than are illustrated as well as lesser or further functionality, and may adapt to the data packets exchange functionality rather than voice packets exchange. In other words, the illustrated end point device is meant merely to offer one example of possible functionality and construction in accordance with the present invention.

The end point device 807 is communicatively coupled to external network devices, such as remote device 881, via networks 875. The external network device 881 may also consist of elements of present invention such as processing circuitry 883 and local storage 895 such as SMM 885 and PT, ST & AL 887, SF 891, CA 893 and SNTD 889 among other functional blocks of the present invention. The server or client devices typically communicate with each other by exchanging packets. These packets may contain web page requests and malware induced service attack attempts that may be intentional or otherwise. When a network node, such as remote device 881 detects the service attack attempt it takes one of many possible steps, as described with reference to the FIG. 4.

Figure 9:
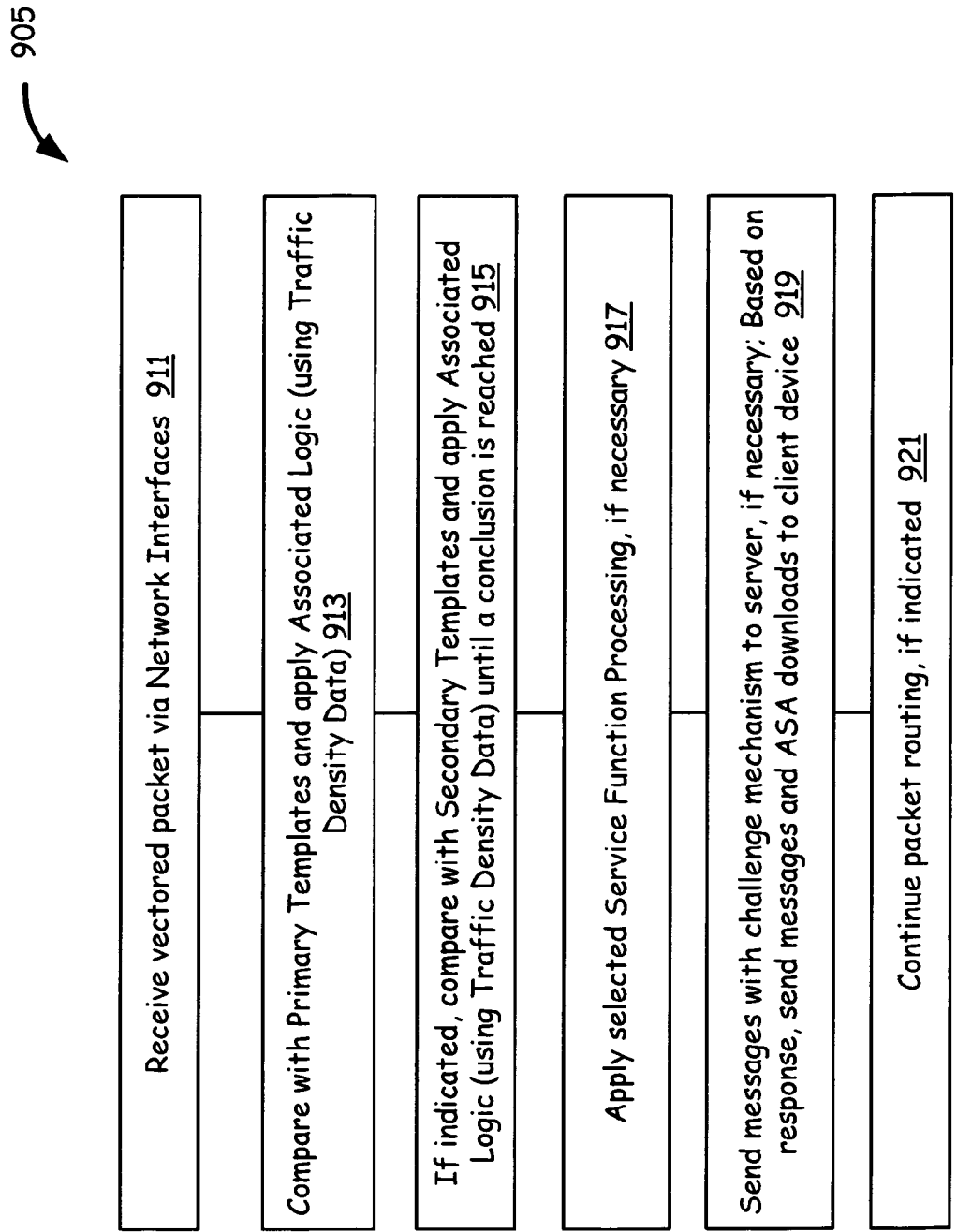
FIG. 9 is a flowchart illustrating general flow of functionality of intermediate packet pathway node of FIG. 1.

FIG. 9 is a flowchart 905 illustrating general flow of functionality of intermediate packet pathway nodes of FIG. 1. The functionality begins with the intermediate nodes receiving a packet containing request for a web page, and the request being a service attack attempt, at a block 911. At a next block 913, the intermediate nodes compare the received packet with primary templates and apply associated logic using traffic density data. At a next block 915, if indicated in the logic associated with primary templates, the intermediate nodes compare the packet with secondary templates and apply associated logic using traffic density data.

At a next block 917, the intermediate nodes apply selected service functions on the packet, part of which includes invoking communication applications. At a next block 919, the intermediate nodes send messages with challenge mechanism to the server, if necessary. Based on the response, the intermediate nodes send messages with human challenges and anti-service attack downloads to the client devices. Then, at a next block 921, the intermediate nodes continue routing the packet toward server.

Figure 10:
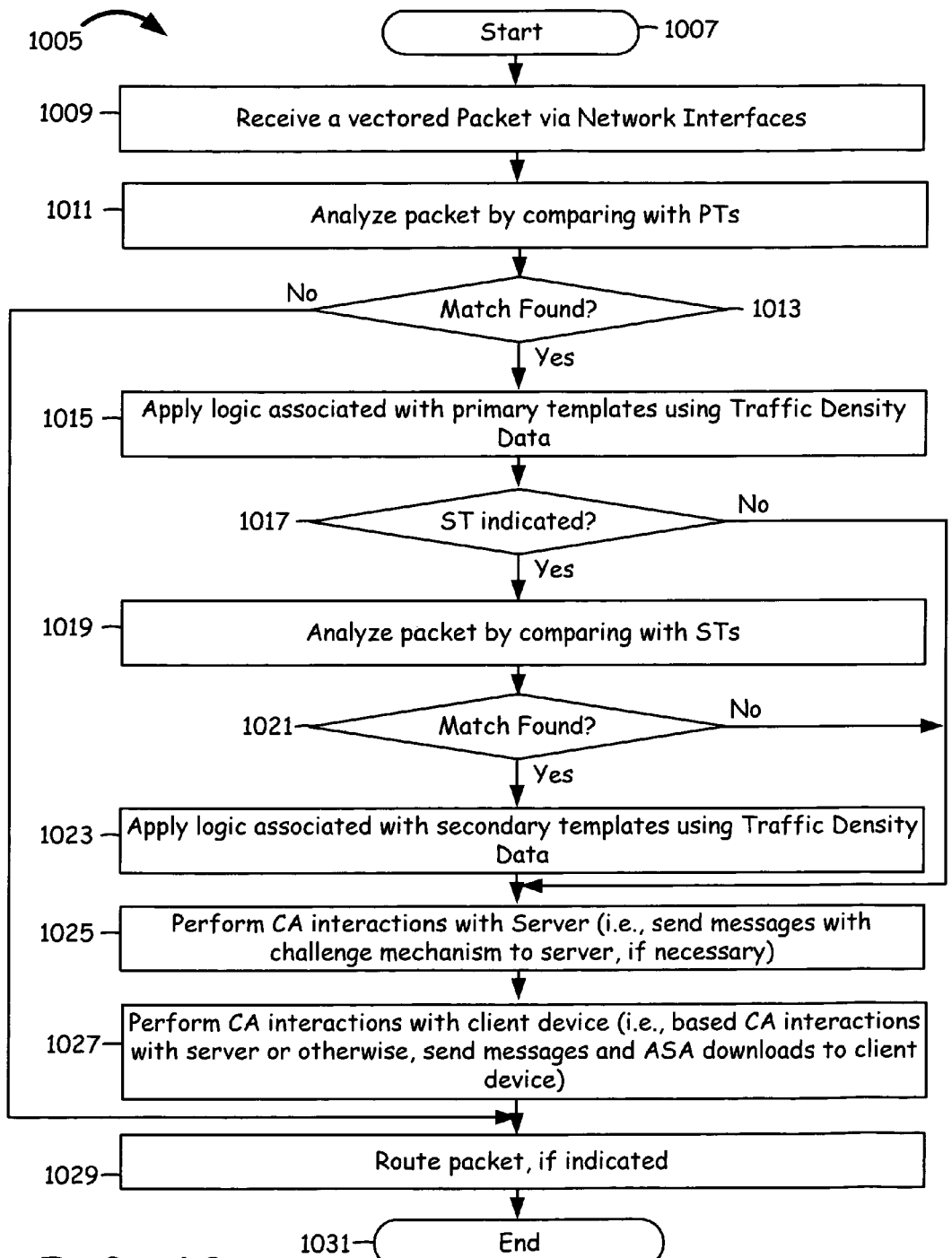
FIG. 10 is a flowchart illustrating functionality of intermediate packet pathway node of FIG. 1, in detail.

FIG. 10 is a flowchart illustrating functionality of intermediate packet pathway nodes of FIG. 1, in detail. The detailed functionality of the network device begins at a start block 1007. At a next block 1009, the intermediate nodes receive a vectored packet via network interfaces. At a next block 1011, the intermediate nodes analyze the packet by comparing with primary templates. At a next decision block 1013, the intermediate nodes verify if any matches are found. If no matches are found for a web page request, at a next block 1029, the intermediate nodes route the packet and the detailed functionality ends at a next end block 1031.

If a match is found at the decision block 1013, at a next block 1015 the intermediate nodes apply logic associated with the primary templates using traffic density data. At a next decision block 1017, the intermediate nodes verify if secondary templates are indicated. If yes, at a next block 1019, the intermediate nodes analyze the packet by comparing it with secondary templates. If no secondary templates are indicated, the detailed functionality jumps to a next block 1025.

At a next decision block 1021, the intermediate nodes verify if any matches are found. If no matches are found for a web page request or a service attack attempt, the detailed functionality jumps to a next block 1025. At a next block 1023, the intermediate nodes apply logic associated with the secondary templates using traffic density data. The traffic density data is used to verify if the webpage request is a service attack attempt.

At a next block 1025, the intermediate nodes perform communication application interactions with server. That is, send messages with challenge mechanism to the server, if necessary. At a next block 1027, the intermediate nodes perform communication application interactions with client device. The intermediate nodes based on the responses from the server or otherwise, send messages and anti-service attack downloads to the client and receives response. At the next block 1029, the intermediate nodes route the packet and the detailed functionality ends at the end block 1031.

Figure 11:
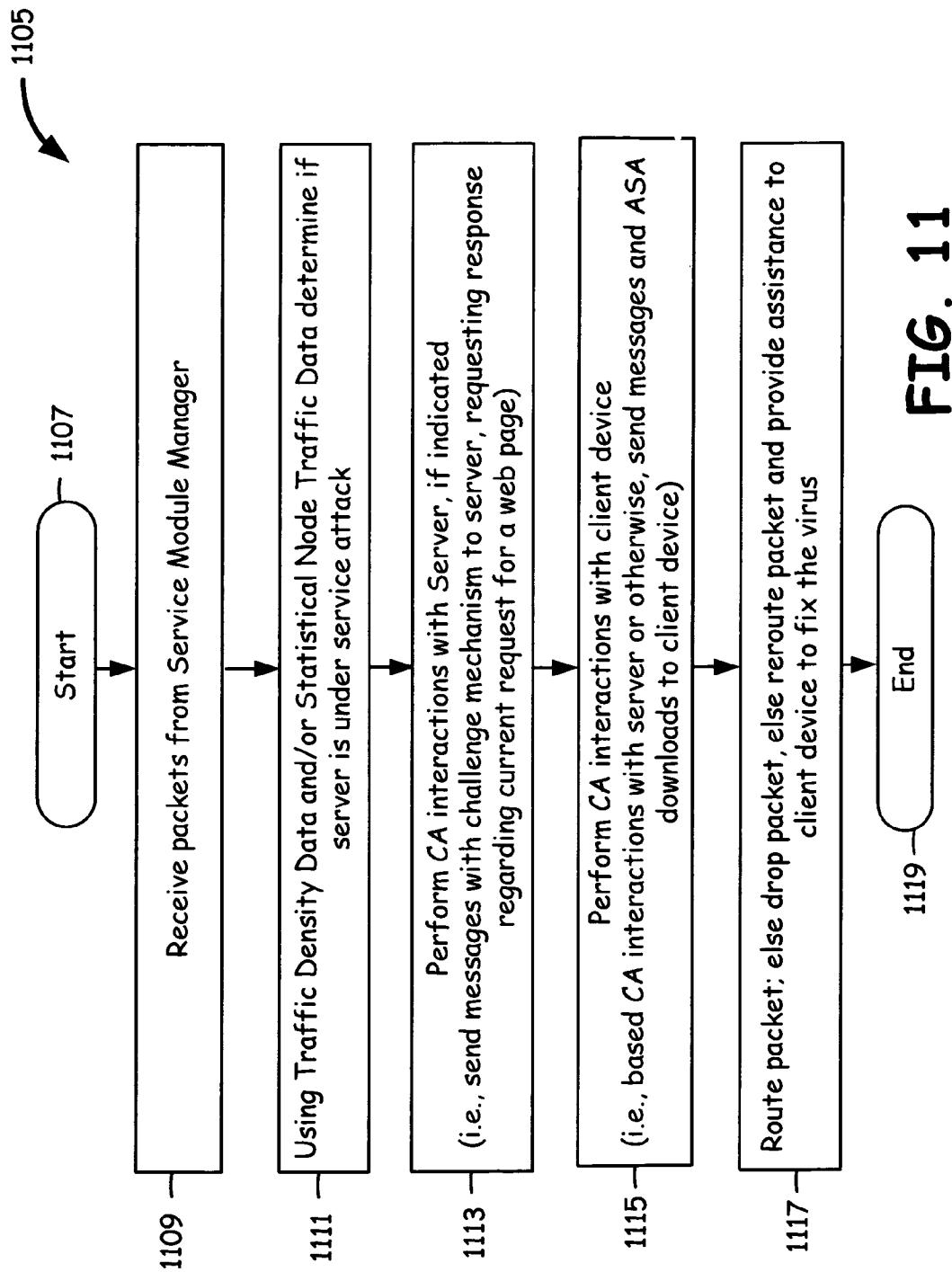
FIG. 11 is a flowchart illustrating traffic density data processing circuitry functionality of intermediate packet pathway node of FIG. 1, by utilizing the traffic density data.

FIG. 11 is a flowchart 1105 illustrating traffic density data processing circuitry functionality of intermediate packet pathway node of FIG. 1, by utilizing the traffic density data. The traffic density data processing circuitry functionality begins at a start block 1107. At a next block 1109, the traffic density data processing circuitry receives packets from the service module manager. At a next block 1111, using traffic density data and/or statistical node traffic data, the traffic density data processing circuitry determines if server is under service attack.

At a next block 1113, the traffic density data processing circuitry performs or prompts communication applications to perform communication application interactions with server. That is, send messages with challenge mechanism to the server, if necessary and request for response regarding current request for a web page. At a next block 1115, the traffic density data processing circuitry performs or prompts communication applications to perform communication application interactions with client device. The traffic density data processing circuitry based on the responses from the server or otherwise, sends messages and anti-service attack downloads to the client device and receives response. Then, at a next block 1117, the traffic density data processing circuitry prompts the processing circuitry to route the packet toward server. If settings suggest, the traffic density data processing circuitry drops the packet containing web requests or reroutes the packet towards another server. In addition, the traffic density data processing circuitry may provide assistance to the client device to fix the malware. The traffic density data processing circuitry functionality ends at the end block 1031.

As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A communication infrastructure comprising:
a plurality of client devices;
a server;
a plurality of intermediate routing nodes; and
a first of the plurality of intermediate nodes receives packets from the plurality of client devices;
the first of the plurality of intermediate routing nodes analyzes each of the packets received, the analysis involving at least a comparison of each of the packets with a first template and a second template;
the first of the plurality of intermediate routing nodes, identifies at least a possibility of a service attack on the server based on an unusually high frequency of packets received that match both the first template and the second template;
the first of the plurality of intermediate routing nodes responds to the identification by invoking a service attack function by sending a human challenge to one or more clients to ensure that a request is made by a user of a respective device.

2. The communication infrastructure of claim 1, wherein the first of the plurality of intermediate routing nodes identifies the at least the possibility of the service attack on the server based also on timing information based on current date and time associated with the receipt of at least some of the packets destined for the server.

3. The communication infrastructure of claim 1, wherein the first of the plurality of intermediate, routing nodes identifies the at least the possibility of the service attack on the server based on a statistical analysis.

4. The communication infrastructure of claim 1, wherein the first template targets a network address of the server, and the second template targets at least a portion of a web page request.

5. The communication infrastructure of claim 1, further comprising a support server that provides malware identification services.

6. The communication infrastructure of claim 1, wherein a support server provides malware removal services.

7. The communication infrastructure of claim 1, wherein a support server hosts at least a portion of the service attack function.

8. The communication infrastructure of claim 5, wherein the first of the intermediate routing nodes provides at least a portion of the service attack function.

9. The communication infrastructure of claim 1, wherein the service function also delivers a service attack message.

10. The communication infrastructure of claim 1, wherein the service function also delivers software targeting malware.

11. An intermediate routing node in a communication infrastructure that routes a packet from a source device toward a destination device, the intermediate routing node comprising:
- a network interface;
- storage containing a first template, second template and prior traffic data; and
- processing circuitry coupled to the storage and to the network interface;
- the processing circuitry to receive packets;
- the processing circuitry to compare the packets with the first template, second template and the prior traffic data, and identifies at least a possibility of a service attack based on an unusually high frequency of packets received that match both the first template and the second template;
- the processing circuitry, to trigger a service function by sending a human challenge to one or more clients to ensure that a request is made by a user of a respective device.

12. The intermediate routing node of claim 11, wherein the intermediate routing node comprising a router.

13. The intermediate routing node of claim 11, wherein the intermediate routing node comprising an access point.

14. The intermediate routing node of claim 11, wherein the service function also attempts to address denial of service attacks.

15. The intermediate routing node of claim 11, wherein the service function also attempts to address a limitation associated with the destination device.

16. The intermediate routing node of claim 15, wherein the limitation comprising communication bandwidth limitations.

17. The intermediate routing node of claim 15, wherein the limitation comprising processing limitations.

18. The intermediate routing node of claim 11, wherein service function also comprising delivering a download offer of program code targeting malware.

19. A method performed by an intermediate network node in a packet switched communication pathway, in which the packet switched communication pathway routes a packet from a source device toward a destination device, the method comprising:
- receiving packets;
- comparing the packets with a first template, second template and prior traffic data;
- identifying at least a possibility of a service attack based on an unusually high frequency of packets received that match both the first template and the second template and associated with the destination; and
- based on the comparing and identifying, triggering a service function by sending a human challenge to one or more clients to ensure that a request is made by a user of a respective device.

20. The method of claim 19, wherein the service function attempts to address a potential denial of service attack and the prior traffic data comprises information regarding previous packets received that were addressed to the destination device.

21. The method of claim 20, wherein the information comprising packet receipt frequency.

22. The method of claim 19, wherein the triggering further includes sending a request to a support server.

* * * * *

UNITED STATES PATENT AND TRADEMARK OFFICE
CERTIFICATE OF CORRECTION

PATENT NO. : 7,751,397 B2  
APPLICATION NO. : 11/527137  
DATED : July 6, 2010  
INVENTOR(S) : James D. Bennett Page 1 of 1

It is certified that error appears in the above-identified patent and that said Letters Patent is hereby corrected as shown below:

Col. 16, line 48, in Claim 3: after "intermediate", delete ","
Col. 18, line 19, in Claim 19: after "destination", insert --device--

Signed and Sealed this
Twenty-seventh Day of March, 2012

David J. Kappos
*Director of the United States Patent and Trademark Office*